2,876,382

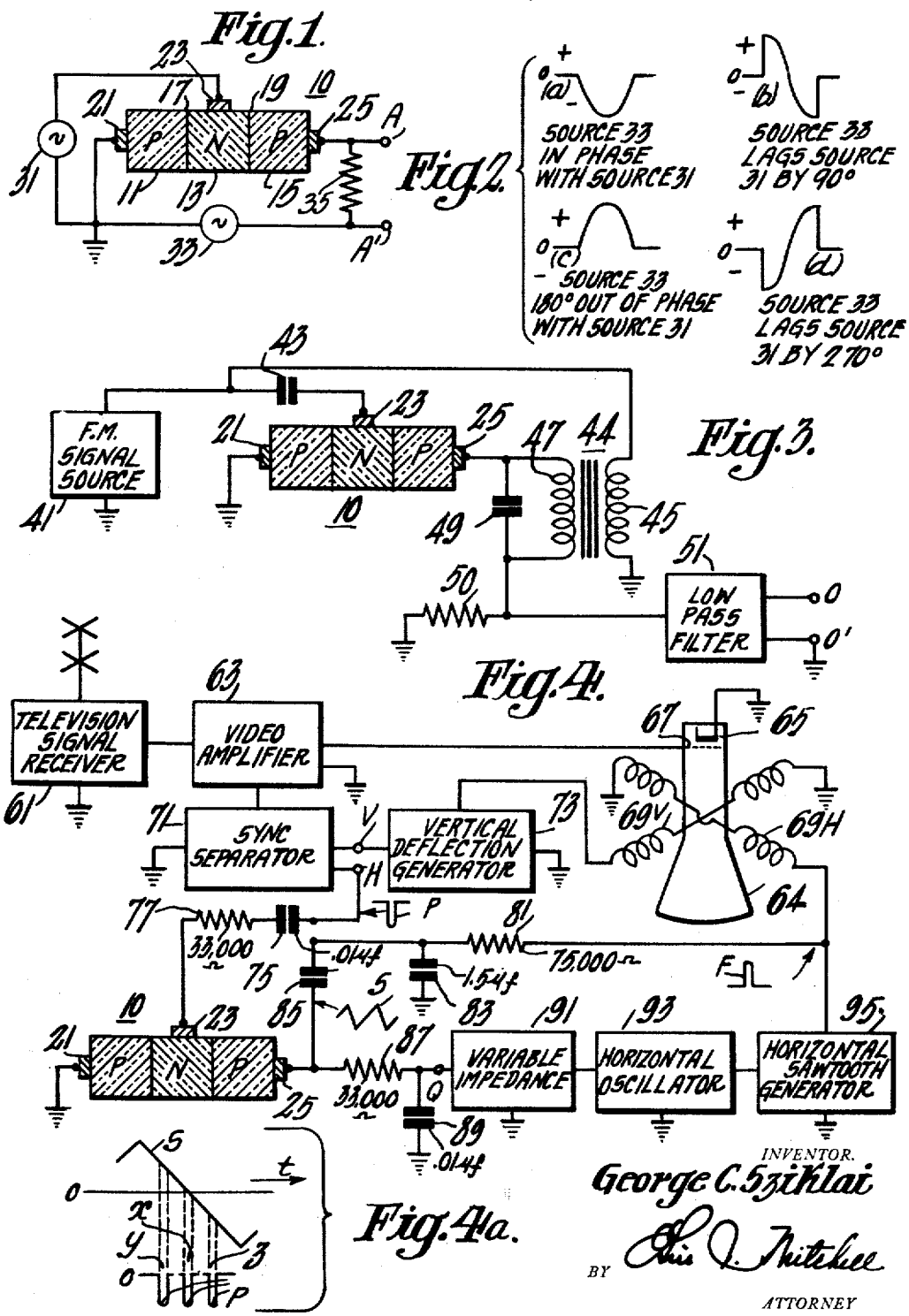

PHASE COMPARISON

George C. Sziklai, Princeton, N. J., assignor to Radio Corporation of America, a corporation of Delaware Application November 15, 1952, Serial No. 320,712

17 Claims. (Cl. 315—27)

This invention relates to phase comparison and phase detection, and particularly to apparatus for, and methods of, comparing the phases of electrical signals and deriving therefrom control voltages and current indicative of existing phase relationships.

There are many instances, particularly in electrical signalling systems, where there is a need for apparatus to compare in phase a pair of electrical waves and produce a signal indicative of the sense and magnitude of the phase difference, if any exists. In one common type of utilization of phase comparison apparatus, a local controllable wave is compared in phase with a standard or reference wave, or some other electrical wave not subject to local control, and a control signal is developed which may be applied to control the generation of the local wave so as to bring it into synchronous frequency and phase relationship with the standard, reference, or externally controlled wave. Examples of this type of utilization are some of the A. F. C. systems commonly used for line synchronization in television receivers, such as those discussed in an article by E. L. Clark, entitled "Automatic Frequency Phase Control of Television Sweep Circuits," in the May, 1949 issue of "Proceedings of the I. R. E.," commencing on page 497.

Another common type of utilization of phase comparison or phase detection apparatus is in the automatic frequency control of the I. F. carrier frequency in many conventional A. M. and F. M. signal receivers wherein undesired frequency shifts of an I. F. carrier wave are corrected by detecting the resulting change in phase difference between a pair of electrical waves and deriving a correcting control voltage thereby. This type of utilization is illustrated by the discriminator-detector network discussed in an article by D. E. Foster and S. W. Seeley, entitled "Automatic Tuning, Simplified Circuits, and Design Practice" appearing in the March, 1937 issue of "Proceedings of the I. R. E.," commencing on page 289.

Similarly, phase comparison or phase detection operations are incorporated in the performance of several well-known forms of F. M. signal demodulators, such as the phase discriminator type or the ratio detector type, wherein signal recovery depends upon detection of changes in the phase relationship of a pair of electrical waves resulting from signal displacements of a carrier wave from a center frequency.

The present invention provides improved phase comparison and detection apparatus, which effects considerable simplification of circuitry in utilizations of the type above described without sacrifice of accuracy or efficiency of performance.

In accordance with the principles of operation of the present invention, phase differences between two electrical waves are detected by applying one of the electrical waves between the two end zones of a junction transitor, and applying the other electrical wave between the intermediate zone and one of the two end zones of the junction transistor. The magnitude and polarity of the D. C. component of an output signal derived from an output circuit connected between the two end zones of the junction transistor are representative of the magnitude and sense of the existing phase difference between the two electrical waves.

Several embodiments of the present invention, which are presented in the instant specification, illustrate applications of these principles of operation to phase measurement, A. F. C., and F. M. signal demodulating systems. Other useful applications of these operating principles will be readily suggested by the illustrated examples.

An object of the present invention is to provide improved phase comparison apparatus.

Another object of the present invention is to provide simplified apparatus for detecting phase differences between electrical waves.

A further object of the present invention is to provide an improved system for indicating the magnitude and sense of a phase difference existing between electrical signals.

An additional object of the present invention is to provide an improved system for demodulating angle modulated waves, which system incorporates simplified phase detection apparatus.

Another object of the present invention is to provide an improved A. F. C. system incorporating simplified phase comparison apparatus.

A further object of the present invention is to provide an improved system for automatic frequency control of a television sweep circuit.

An additional object is to provide an improved method of detecting the magnitude and sense of phase differences existing between electrical waves.

Other and incidental advantages and objects of the present invention will become apparent to those skilled in the art from a reading of the following specification and an inspection of the accompanying drawings in which:

Fig. 1 is a schematic circuit diagram of a phase comparison apparatus embodying the principles of the present invention.

Fig. 2 illustrates in graphic form output voltage waveforms appearing in the circuit of Fig. 1 for various phase relationships.

Fig. 3 shows in block and schematic form an F. M. signal demodulating system embodying the principles of the present invention.

Fig. 4 shows in block and schematic form a television receiving system incorporating a line synchronization A. F. C. system embodying the principles of the present invention.

Fig. 4(a) illustrates in graphic form several possible phase relationships between the signals being compared in the A. F. C. system of Fig. 4.

Explanation of the operation of the present invention will be facilitated by reference first to the simple embodiment illustrated in Fig. 1. A pair of alternating current (A. C.) wave sources are designated by reference numerals 31 and 33. It will be assumed that these sources have nominally the same frequency, but that it is desired to determine the magnitude and sense of the phase difference, if any, existing between the output waves of the respective sources.

To effect this determination, a simple phase comparison circuit utilizing a single junction transistor is provided. A junction transistor 10 of the p-n-p type is shown in Fig. 1. The transistor 10 comprises a body of semiconductive material, such as germanium or silicon, having two p-type regions 11 and 15, separated by and contiguous with opposite surfaces of an n-type region 13. Electrical "barriers," as discussed in U. S. Patent No. 2,569,347 to William Shockley, issued on September 25, 1951, occur at the interfacial junctions 17, 19. The electrodes 21, 23 and 25, by which external circuit connections are made to the respective regions 11, 13 and 15, make essentially ohmic (non-rectifying) contacts with their respective regions. In accordance with conventional nomenclature in the transistor art, the electrodes 21, 23 and 25 will be referred to as emitter, base and collector, respectively.

The practitioner of the present invention who should desire a theoretical background on junction transistors in general may refer to the aforesaid Shockley patent and to the following publications for a preliminary knowledge of the nature of the junction transistor, some of its better known characteristics, and projected theories of its operation: "The Theory of p-n Junctions in Semiconductors and p-n Junction Transistors" by W. Shockley, appearing in volume 28 (1949) of the Bell System Technical Journal, starting at page 435; "Electrons and Holes in Semiconductors" by W. Shockley, published by D. VanNostrand Co. in 1950; "p-n Junction Transistors" by W. Shockley, M. Sparks and G. K. Teal, appearing in volume 83 of the Physical Review, starting at page 151 in the July 1, 1951 issue; "Some Circuit Properties and Applications of n-p-n Transistors" by R. L. Wallace, Jr. and W. J. Pietenpol, appearing in volume 39 of the Proceedings of the I. R. E., starting at page 753 in the July, 1951 issue.

The present invention utilizes to advantage the property of a junction transistor whereby, under appropriate conditions, current may be caused to flow in either direction through the emitter-collector path of the transistor, i. e. relying upon the bidirectional current characteristics of junction transistors, as revealed and discussed in the copending application of George C. Sziklai, Sr. No. 308,618, filed on September 9, 1952, and entitled "Electronic Switching," now U. S. Patent No. 2,728,857, issued December 27, 1955. Thus, in view of the bidirectional character of the current flow through the emitter-collector path of the transistor 10, it will be appreciated that the designation of electrode 21 as emitter and electrode 25 as collector is essentially arbitrary and not intended to be restrictively indicative of their respective functions.

The emitter 21 of transistor 10 is connected to a point of reference potential, such as ground. A direct connection between one output terminal of source 31 and the base 23, and a direct connection between the other output terminal of source 31 and the grounded emitter 21 complete a base-emitter control circuit. A direct connection between one output terminal of source 33 and the grounded emitter 21, and a connection including an output resistor 35 between the other output terminal of source 33 and the collector 25 complete an emitter-collector output circuit. A pair of output terminals, A and A', are respectively connected to opposite ends of the output resistor 35.

During alternate half-cycles of the output waveform of source 31 the potential at base 23 is more positive than the reference potential at emitter 21. There is thus established a "reverse bias" between the base 23 and the emitter 21 during these half-cycles (to be hereinafter referred to as positive half-cycles), and conventional current flow in the base-emitter path of the transistor 10 is in the base-to-emitter direction. This is the "difficult" direction of current flow in the base-emitter path, which presents a relatively high impedance to current so flowing therein. As explained in the aforementioned copending Sziklai application, there can be substantially no current flow in the emitter-collector path of a transistor when current flow in the base-emitter path is in this "difficult" direction. Thus, during positive half-cycles of the ouput of source 31, there is substantially no current flow in the output resistor 35, and substantially zero voltage appears across terminals A, A'.

During the half-cycles of the output of source 31 when the potential at base 23 is more negative than the reference potential at emitter 21, there is established a "forward bias" between the base 23 and the emitter 21. The direction of conventional current flow in the base-emitter path of transistor 10 during these latter half-cycles (to be hereinafter referred to as negative half-cycles) is in the emitter-to-base direction. This is the "easy" direction of current flow in the base-emitter path, which presents a very low impedance to current so flowing therein. As also explained in the aforementioned copending Sziklai application, a substantial current may flow in the emitter-collector path of a transistor when current flow in the base-emitter path is in the "easy," low impedance direction, the magnitude and direction of the emitter-collector current depending upon the magnitude and polarity of the potential difference between emitter potential and collector potential. Thus, during negative half-cycles of the output of source 31, current flows through the output resistor with a magnitude and direction determined by that portion of the cyclic output wave of source 33 which is developed during these negative half-cycles of source 31. The magnitude and polarity of the voltage appearing across output terminals A, A' is accordingly determined.

It may now be apparent that the average D. C. value and the polarity of the D. C. component of the output voltage wave appearing across terminals A, A' will depend upon the difference in phase between the output waves of sources 31 and 33. This may be illustrated by reference to Fig. 2, which graphically shows output voltage waveforms which appear across terminals A, A' under several conditions of phase relationship between the output waves of sources 31 and 33. The lines designated O in the graphs of Fig. 2 represent the potential at terminal A as a reference potential. Voltage values plotted in the minus direction therefore represent output voltages of a polarity such that terminal A' is more negative than terminal A, while voltage values plotted in the plus direction represent output voltages of a polarity such that terminal A' is more positive than terminal A. It is assumed, by way of example only, that the wave developed by source 33 is substantially sinusoidal in shape.

When the output of source 33 is in phase with the output of source 31, a negative half-cycle of the output of source 33 (i. e. a half-cycle during which the potential at collector 25 is more negative than the reference potential at emitter 21) occurs during the same period that a negative half-cycle of the output of source 31 occurs. Thus, during this significant period when the emitter-collector path of transistor 10 is conductive, current flow through the output resistor 35 is unidirectional. The output voltage appearing across terminals A, A' is in the form of a full negative half-cycle, as shown by waveform (a) in Fig. 2.

When the output of source 33 lags the output of source 31 by 90°, equal portions of a positive half-cycle and a negative half-cycle of the output of source 33 occur, in that order, during the significant period when the emitter-collector path of transistor 10 is conductive. Current flow through the output resistor 35 is bidirectional. The output waveform appearing across terminals A, A' comprises a positive quarter-cycle followed by a negative quarter-cycle, as shown by waveform (b).

When the output of source 33 is 180° out of phase with the output of source 31, a full positive half-cycle of the output of source 33 occurs during the significant period when the emitter-collector path of transistor 10 is conductive. Current flow through the output resistor 35 is unidirectional but the single direction of current flow is opposite to the single direction of current flow in the previously described in-phase example. The output voltage appearing across terminals A, A' is in the form of a full positive half-cycle, as shown by waveform (c).

When the output of source 33 lags the output of source 31 by 270°, equal portions of a negative half-cycle and a positive half-cycle of the output of source 33 occur, in that order, during the significant period when the emitter-collector path of transistor 10 is conductive. Current flow through the output resistor 35 is bidirectional. The output voltage waveform appearing across terminals A, A' comprises a negative quarter-cycle followed by a positive quarter-cycle, as shown by waveform (d).

The nature of the output voltage waveforms for phase relationships intermediate those chosen as examples, may be readily deduced from the illustrations in Fig. 2. Thus, if the output of source 33 lags the output of source 31 by an angle less than 90°, the output voltage waveform comprises unequal portions of successive positive and negative half-cycles, the negative half-cycle portion exceeding in duration the preceding positive half-cycle portion. The ratio of the duration of the positive half-cycle portion to the duration of the negative half-cycle portion increases from zero toward unity as the angle increases from 0° toward 90°.

If the output of source 33 lags the output of source 31 by angle less than 180° but greater than 90°, the output voltage waveform comprises unequal portions of successive positive and negative half-cycles, the negative half-cycle portion being shorter in duration than the preceding positive half-cycle portion. The ratio of the duration of the positive half-cycle portion to the duration of the negative half-cycle portion increases from unity toward infinity as the angle increases from 90° toward 180°.

If the output of source 33 lags the output of source 31 by an angle less than 270° but greater than 180°, the output voltage waveform comprises unequal portions of successive negative and positive half-cycles, the positive half-cycle portion exceeding in duration the preceding negative half-cycle portion. The ratio of the duration of the positive half-cycle portion to the duration of the negative half-cycle portion decreases toward unity as the angle increases from 180° toward 270°.

If the output of source 33 lags the output of source 31 by an angle greater than 270° but less than 360° (in-phase condition), the output voltage waveform comprises unequal portions of successive negative and positive half-cycles, the positive half-cycle portion being shorter in duration than the preceding negative half-cycle portion. The ratio of the duration of the positive half-cycle portion to the duration of the negative half-cycle portion decreases from unity toward zero as the angle increases from 270° toward 360°.

For continuity of description, the explanation of output voltage waveforms has been presented solely in terms of angle of lag of the output of source 33. However, it will be appreciated that an explanation in terms of angle of lead of the output of source 33 is inherently included since any given angle of lag may be expressed as an angle of lead by stating the supplement of the angle of lag. Thus, for example, while waveform (d) has been presented as showing the output voltage waveform obtained when the output of source 33 lags the output of source 31 by 270°, an equivalent, and perhaps more conventional, statement of the existing phase relationship in this instance would be that waveform (d) shows the output voltage waveform obtained when the output of source 33 leads the output of source 31 by 90°.

The phase difference information contained in the output voltage (and current) of the circuit of Fig. 1 may be utilized in a variety of ways. As an example, by the employment of conventional cathode ray tube (CRT) display techniques, the output voltage (or output current) waveforms may be traced on the screen of a cathode ray tube. Any angle of phase difference between the output of source 31 and the output of source 33 over the full range of 360° may be recognized by visual observation, and, after suitable calibration, may be accurately determined via measurement of the ratio of durations (or amplitudes) of the positive and negative portions of the displayed waveform.

Also by suitably filtering or integrating the output voltage appearing across terminals A, A' to remove the A. C. component thereof, the angle of phase difference may be simply and accurately measured over a range of 180° by use of a meter, such as one of the well-known zero-center type, to indicate the magnitude and polarity of the remaining D. C. component.

It may be appreciated that it would be desirable, though not essential, that the junction transistor 10 employed in the present invention be "symmetrical" in the sense discussed in the aforementioned copending application of Sziklai: i. e. that current characteristics for both directions of current flow through the emitter-collector path be essentially symmetrical. Not all junction transistors attain this condition of symmetry; primarily as a consequence of the particular procedure employed in their fabrication or development, some junction transistors present a substantially greater impedance to current flow in one direction between the outer zones, for a given set of bias conditions, than they present to current flow in the opposite direction between the outer zones under equivalent bias conditions.

While there are many contributing factors which may determine the presence of lack of such symmetry in a junction transistor, it is believed by the applicant that if the resistivities of the two outer zones are substantially equal and if the two junctions are symmetrical (i. e. if the junction between one outer zone and the intermediate zone is substantially equal in magnitude or extent to the junction between the other outer zone and the intermediate zone), a sufficient degree of symmetry in current characteristics is achieved to permit consideration of the unit as a "symmetrical" junction transistor.

Thus it should be stated that, though successful phase comparison may be achieved with the present invention using "asymmetrical" transistor units, the circuit is operated to full advantage with maximum simplicity and accuracy if the transistor 10 is a substantially "symmetrical" unit. In this connection, however, it may further be noted that, as taught in the aforementioned copending Sziklai application, the symmetrical effects obtained by utilizing a "symmetrical" transistor may be substantially duplicated by utilizing a parallel combination of two "asymmetrical" transistors wherein the parallel connection is made in an asymmetry balancing manner such that the net current characteristics are "symmetrical."

It will be appreciated that the invention is applicable to detection of phase difference between electrical signals of similar periodicity, whatever their waveshape may be. Thus, for example, the output of source 31 in the circuit of Fig. 1 may be in the form of square waves. The shape of the resulting output voltage waveforms would then be substantially sinusoidal as illustrated in Fig. 2.

However, as another example, the output of source 31 in the circuit of Fig. 1 may be in the form of waves of sinusoidal shape. The shape of the resulting output voltage waveforms would then depart somewhat from the sinusoidal form illustrated in Fig. 2 due to a continual variation in the impedance of the emitter-collector path of the transistor 10 during each conductive period. Nevertheless, the results would still follow the performance as previously outlined as to proportionality of negative and positive portions of the output voltage waveforms, magnitude and polarity of the D. C. component of the output voltage, etc.

An example of utilization of the principles of the invention in the detection of phase difference between a pair of electrical waves of similarly sinusoidal shape will follow in the description of the F. M. signal demodulator illustrated in Fig. 3. An example of utilization of the principles of the invention in the detection of phase difference between a signal of pulse waveform and a signal of sawtooth waveform will also follow in the description of the television line synchronization system shown in Fig. 4.

Turning now to Fig. 3, there is shown a system applying the phase detection principles of the present invention to the demodulation of frequency modulated (F. M.) signals. A source of frequency modulated signals, which may, for example, comprise the I. F. amplifier of a conventional F. M. signal receiver, is designated by reference numeral 41. One output terminal of the source 41 is coupled by a capacitor 43 to the base 23 of the p-n-p junction transistor 10. The other output terminal of the source 41 is connected to a point of reference potential (i. e. ground). The emitter 21 of the transistor 10 is also grounded.

The primary coil 45 of a transformer 44 is connected between the output terminals of the source 41. The secondary coil 47 of transformer 44 is shunted by a capacitor 49, the parallel combination being tuned to resonate at the center or resting frequency of the F. M. signal. One end of the secondary coil 47 is connected to the collector 25 of transistor 10, while the other end of the secondary coil 47 is connected to ground via an output resistor 50.

The F. M. signal output of source 41 appears across the base-emitter path of the transistor, as did the output of source 31 in Fig. 1. During each positive swing of the F. M. signal appearing across the base-emitter path, when the base 23 is at a more positive potential than the grounded emitter 21, the emitter-collector path of transistor 10 is effectively open and no current flows through the output resistor 50. However, during each negative swing of the F. M. signal appearing across the base-emitter path, when the base 23 is at a more negative potential than the grounded emitter 21, the emitter-collector path of transistor 10 is conductive. The magnitude and direction of the current flowing through the emitter-collector path during each conductive period will vary in accordance with variations in magnitude and polarity of the signal voltage appearing across the emitter-collector path during such periods.

Thus to appreciate the nature of the emitter-collector current and the voltage waveforms generated across the output resistor 50 during a conductive period, we must investigate the character of the F. M. signal appearing across the emitter-collector path. It is readily apparent that the F. M. signal appearing across the emitter-collector path of the transistor 10 is not in phase with the F. M. signal appearing across the base-emitter path of transistor 10.

That the angle of phase difference between the signal appearing across the emitter-collector path and the signal appearing across the base-emitter path varies with signal frequency will be appreciated from the following explanation. As is well known, the current flowing in a tuned secondary of a transformer is 90° out of phase with the primary current when the operating frequency is equal to the resonant frequency; correspondingly, the voltage across the tuned secondary is 90° out of phase with the voltage across the primary when the operating frequency is equal to the resonant frequency. Whether the 90° phase is in a lagging or leading direction depends, of course, upon whether the coils are oppositely wound or not and whether the coil terminals are correspondingly connected or not in the respective primary and secondary circuits.

Assuming coil winding and connection relationships such that the secondary voltage lags the primary voltage by 90° at resonance, the following holds true: When the operating frequency is higher than the resonant frequency of the tuned secondary, the secondary voltage lags the primary voltage by an angle less than 90°, the decrease in the lagging angle below 90° being proportional to the increase in the operating frequency over the resonant frequency. When the operating frequency is lower than the resonant frequency of the tuned secondary, the secondary voltage lags the primary voltage by angle greater than 90°, the increase in the lagging angle above 90° being proportional to the decrease in the operating frequency below the resonant frequency.

Assuming coil winding and connection relationships such that the secondary voltage leads the primary voltage by 90° at resonance, the following holds true: When the operating frequency is higher than the resonant frequency of the tuned secondary, the secondary voltage leads the primary voltage by an angle greater than 90°, the increase in the leading angle above 90° being proportional to the increase in the operating frequency over the resonant frequency. When the operating frequency is lower than the resonant frequency of the tuned secondary, the secondary voltage leads the primary voltage by an angle less than 90°, the decrease in the leading angle below 90° being proportional to the decrease in the operating frequency below the resonant frequency.

Thus, it may be observed that (under either transformer poling condition) the phase of a tuned secondary voltage will vary in accordance with the frequency of the signal applied to the primary, and that opposite changes in signal frequency from the resonant frequency of the tuned secondary will cause departures in opposite directions from a 90° phase difference between primary and secondary voltages. This is also true as to phase differences between the primary and secondary currents.

Let us now apply these well-known principles associated with the operation of a transformer with a tuned secondary to an explanation of the operation of the embodiment shown in Fig. 3. First, it will be apparent that the signal appearing across the primary 45 of the transformer 44 will always be substantially in phase with the signal appearing across the base-emitter path of the transistor 10. The phase of the signal appearing across the emitter-collector path of the transistor 10 will however vary with the frequency of the signal output of source 41, since the phasing of the signal across the tuned secondary 47 of the transformer 44 accords with the well-known principles just outlined above. The character of the waveform of the current through the load, output resistor 50, and the voltage across the output resistor 50, and the existence, magnitude, and polarity of D. C. components thereof, all of which depend upon the difference in phase between the signals appearing respectively across the base-emitter and emitter-collector paths of transistor, thus depend upon, and are indicative of, the frequency of the signal output of source 41.

When the signal output of source 41 is at the center or resting frequency, the voltage across secondary 47 is 90° out of phase with the voltage across primary 45, and the D. C. component of the output voltage appearing across the output resistor 50 is hence substantially zero (i. e. the average D. C. value of the output votage is substantially zero). The output voltage waveform when the signal is at the center frequency is of the character wherein the negative and positive portions of the waveform are substantially equal.

For example only, it shall be assumed that poling conditions for transformer 44 are such that the secondary voltage lags the primary voltage. As modulation causes the signal frequency to go higher than the center frequency, the lagging angle of phase difference between the signals appearing respectively across the emitter-collector and base-emitter paths of transistor 10 become less than 90°. A greater portion of the negative swing of the signal across the secondary 47 and a lesser portion of its positive swing appear across the emitter-collector path of transistor 10 during each significant period of conductivity therefor. As a result, the output voltage across resistor 50 contains a D. C. component of positive polarity relative to ground, the magnitude of this D. C. component being proportional to the amount by which the signal frequency exceeds the center frequency.

Conversely, as modulation causes the signal frequency to go lower than the center frequency, the lagging angle of phase difference between the signals appearing respectively across the emitter-collector and base-emitter paths becomes larger than 90°. A greater portion of the positive swing of the signal across the secondary 47 and a lesser portion of its negative swing appear across the emitter-collector path of transistor during each significant period of conductivity therefor. As a result, the output voltage across resistor 50 contains a D. C. component of negative polarity relative to ground, the magnitude of this D. C. component being proportional to the amount by which the signal frequency falls short of the center frequency.

Thus, as the output signal of source 41 varies in frequency above and below the center frequency in accordance with variations in magnitude and polarity of modulating signal waves, the output voltage appearing across resistor 50 contains a D. C. component subject to variations in magnitude and polarity corresponding to such modulating signal variations. By connecting across the output resistor 50 a low-pass filter 51, through which modulating signal variations of the D. C. component may pass, but through which the carrier or modulated signal frequencies may not pass, recovered modulating signal waves are available at the output terminals O, O' of the filter 51 for appropriate utilization.

A significant advantage of this F. M. demodulator embodying the principles of the present invention, in addition to its simplicity and accuracy, is its substantial insensitivity to amplitude modulations of the applied F. M. signal. For, as undesired amplitude modulations increase the signal amplitude the emitter-collector impedance drops, and as they decrease the signal amplitude the emitter-collector impedance rises. Thus, loading of the input varies with signal amplitude, resulting in the production of an output which is substantially independent of amplitude modulations of the applied F. M. signal.

Fig. 4 illustrates an application of the phase detection principles of the present invention to an A. F. C. type of horizontal or line synchronization system in a television receiver installation. A conventional television signal receiver 61 is provided for receiving and demodulating a transmitted television carrier wave. Briefly, it may comprise carrier wave amplifying apparatus, a frequency converter, and a signal detector, by means of which composite television signals, including video and control signals, such as synchronizing pulses, are recovered from the modulated carrier wave. A conventional video amplifier 63, coupled in the usual manner to signal receiver 61, amplifies the composite signal output thereof.

The video amplifier is coupled to a beam intensity control electrode 67 of the image reproducing device 64, which may be a kinescope of conventional type, having the customary components such as a deflection yoke incorporating horizontal deflection coils 69H and vertical deflection coils 69V and an electron gun including a cathode 65 and control grid 67.

A sync signal separator 71 is also coupled to an output circuit of the video amplifier 63. It will be understood that the sync separator 71 segregates the synchronizing pulses from the video signal component and also separates the horizontal and vertical synchronizing pulses from one another. The separated vertical sync pulse output is coupled via terminal V to a vertical deflection wave generator 73 which functions in response to the vertical synchronizing pulses to produce substantially saw-tooth wave energy at a vertical deflection frequency, such as 60 cycles. The output of the vertical deflection generator 73 is coupled to the vertical deflection coils 69V so as to energize them at the vertical deflection frequency. The horizontal deflection coils 69H are energized at a horizontal deflection frequency, such as 15,750 cycles, by substantially sawtooth wave energy supplied by the horizontal sawtooth generator 95, which is driven at a horizontal deflection rate by the output of the horizontal oscillator 93. The precise frequency of operation of the horizontal oscillator 93 is controlled by a variable impedance 91, which is included in the frequency-determining circuit of the oscillator 93. The A. F. C. type of control of the horizontal deflection frequency effected via control of this variable impedance 91 and the apparatus therefor embody the phase detection principles of the present invention, as will be appreciated from the following explanation.

Again, there is provided a junction transistor 10 of the p-n-p type having emitter, base, and collector electrodes, 21, 23, and 25 respectively. The emitter 21 is grounded. Separated horizontal synchronizing pulses P of negative polarity relative to ground, appearing at output terminal H of the sync separator 71, are applied via a capacitor 75 and series resistor 27 to the base 23 of the transistor 10 to periodically cause current to flow in the base-emitter path of transistor 10 in the "easy," low impedance direction. The emitter-collector path of the transistor is thus rendered conductive upon the occurrence of each horizontal synchronizing pulse P.

Horizontal flyback pulses F, derived in a conventional manner from the horizontal deflection coils 69H are applied to an integrating circuit comprising the resistor 81 in series with the capacitor 83. The sawtooth output voltage wave S, appearing across the capacitor 83, is applied via capacitor 85 to the collector 25 of the transistor 10.

The transistor 10 is provided with an output circuit, connected between the collector 25 and the grounded emitter 21, which comprises an integrating circuit including in series the resistor 87 and the capacitor 89, and, as a load shunting the capacitor 89, the input circuit of the variable impedance 91.

Due to the capacitive coupling to the collector 25, the sawtooth wave S at collector 25 tends to appear as an A. C. wave centered about its A. C. axis. In the absence of application of sync pulses P to the base 23, the integrator output appearing across the input circuit of the variable impedance 91 would thus be substantially zero. However since sync pulses P applied to the base 23 do render the emitter-collector path of transistor 10 conductive and thus bring collector 25 to ground potential periodically, it will be appreciated that a D .C. component may thus be added to the A. C. sawtooth wave S and as a result appear in the integrator output applied to variable impedance 91. The presence, magnitude and polarity of this D. C. component depends upon what portion of the sawtooth wave S occurs at collector 25 during the brief period when sync pulse P appears at base 23; i. e. it depends upon the phase relationship between the sawtooth wave S and the synchronizing signal P.

An enlarged portion of the sawtooth waveform S is illustrated in Fig. 4a. Three possible conditions of phase relationship between the sawtooth wave S and the synchronizing signal are exemplified by the illustration of three possible time locations of a sync pulse P relative to the depicted steep retrace portion of the sawtooth wave S.

When sync pulse P occupies the time location "x" relative to the sawtooth wave S, current flow through the emitter-collector path of transistor 10 during its brief conductive period will be bidirectional and substantially no D. C. component will be added to the A. C. sawtooth wave. However, when sync pulse P occupies the time location "y" relative to the sawtooth wave S, current flow through the emitter-collector path of transistor 10 will be unidirecional (i. e. conventional current flow in the collector-emitter direction only), and a D. C. component of a given polarity will be added to the A. C. sawtooth wave that will effect a change of the variable impedance 91 in one direction. On the other hand, when sync pulse P occupies the time location "z" relative to the sawtooth wave S, current flow through the emitter-collector path of transistor 10 will also be unidirectional, but in the opposite direction (i. e. conventional current flow in the emitter-to-collector direction only) and a D. C. component of the opposite polarity will be added to the A. C. sawtooth wave that will effect a change of the variable impedance 91 in the direction opposite to said one direction.

Thus, in operation, when the horizontal oscillator 93 is running in proper frequency and phase relationship with the incoming horizontal synchronizing pulses, there are no D. C. voltage or current components developed by the transistor phase detector circuit, and the impedance presented by the variable impedance device 91 to the frequency-determining circuit of the horizontal oscillator 93 remains unchanged so long as this in-phase relationship continues.

Should the oscillator 93 slow down relative to the incoming sync pulse rate (e. g. due to a frequency drift of the oscillator toward a slower rate, or due to an increase in the rate of the incoming sync pulses), the separated sync pulse wave will assume a leading phase relationship relative to the sawtooth waves (e. g. each sync pulse P appearing during the first half interval of a retrace portion of the sawtooth wave S, such as indicated by time location "y" in Fig. 4A). Without correction, the phase difference would tend to increase, the time of occurrence of a sync pulse P being earlier and earlier relative to a retrace portion of sawtooth wave S each succeeding cycle. However, the result of a phase shift in this direction between the two waves compared in the transistor circuit is the production of a D. C. control voltage in the integrator output that effects a change in the impedance presented by variable impedance 91 in the proper direction to increase the rate of oscillator 93. As oscillator 93 re-approaches the proper frequency of operation, the sync pulses P and the sawtooth wave S again approach the proper in-phase relationship, and the D. C. control voltage returns toward a zero value.

On the other hand, should the oscillator 93 speed up relative to the incoming sync pulse rate (e. g. due to a frequency drift of the oscillator toward a faster rate, or due to a decrease in the rate of the incoming sync pulses), the separated sync pulse wave will assume a lagging phase relationship relative to the sawtooth wave S (e. g. each sync pulse P appearing during the second half interval of a retrace portion of the sawtooth wave S, such as indicated by time location "z" in Fig. 4a). Without correction, this phase difference would tend to increase, the time of occurrence of a sync pulse P being later and later relative to a retrace portion of the sawtooth wave S each succeeding cycle. However, the result of a phase shift in this direction is the production of a D. C. control voltage in the integrator output of a polarity opposite to that produced when the sync pulse wave assumes a leading phase relationship relative to the sawtooth wave S. This then effects a change in the impedance presented by variable impedance 91 in the proper direction to decrease the rate of oscillator 93. As oscillator 93 re-approaches the proper frequency of operation, the sync pulses P and the sawtooth wave S again approach the proper in-phase relationship, and the D. C. control voltage returns toward a zero value.

It will be appreciated that the various television circuits represented by appropriately labelled boxes in Fig. 4 may take the form of conventional tube circuits well known in the art. For example, the combination of the variable impedance 91, the horizontal oscillator 93, and the horizontal sawtooth generator 95 may be similar in form to the combination of reactance tube, deflection control oscillator, and discharge tube sawtooth generator shown in the U. S. Pat. No. 2,460,112 of A. Wright and E. L. Clark, issued on January 25, 1949, and entitled "Beam Deflection Control for Cathode-Ray Devices.

On the other hand, it will also be appreciated that the various television circuits represented by boxes in Fig. 4 may take the form of transistor circuits of appropriate function. Thus, the horizontal sawtooth generator 95 may be in the form of the transistor sawtooth generator disclosed in the aforementioned co-pending application of George C. Sziklai, entitled "Electronic Switching," whereby sawtooth current waves are generated in deflection coils by utilizing a transistor as an electronic switch to periodically open and close a circuit including a potential source in series with the deflection coils.

The horizontal oscillator 95 may take the form of the transistor oscillator disclosed in the co-pending application of G. C. Sziklai and W. S. Pike, Ser. No. 317,854 filed October 31, 1952, and entitled, "Transistor Relaxation Oscillator," now U. S. Patent 2,731,567 issued January 17, 1956. The character of the variable impedance 91, its coupling to the oscillator 93, and the manner in which it effects control of the frequency of operation of the oscillator 93 may be in accordance with the principles of the invention disclosed in the co-pending application of Gerald B. Herzog Ser. No. 320,715, filed November 15, 1952, and entitled, "Frequency Controlled Oscillator System," now U. S. Patent 2,663,800, issued December 22, 1953. Also, for example, the sync separator 71, may be of the transistor type disclosed in the co-pending application of Robert D. Lohman and George C. Sziklai, Ser. No. 319,492 filed November 8, 1952, and entitled "Signalling Systems."

While illustrative embodiments of the present invention have been shown in Figs. 1, 3, and 4 as employing junction transistors of the p-n-p type, it will be readily appreciated that similar embodiments employing junction transistors of the n-p-n type are equally feasible and advantageous. It will be further appreciated that other embodiments of the present invention employing transistors of the so-called point-contact type with circuit and electrode connections similar to those illustrated are also contemplated by the applicant. However, where the available point-contact transistor units have a tendency toward instability in a base-input type of circuit arrangement, the embodiments employing transistors of the junction type will be preferable.

It should again be pointed out that, though "asymmetrical" transistors may be employed in carrying out the principles of the present invention with a reasonable degree of success, accuracy of performance and simplicity of utilization will be maximized if "symmetrical" transistors are employed.

What is claimed is:

1. In an electrical system including a first source of signals and a second source of signals, apparatus for detecting differences in phase between the signals from said two sources comprising the combination of a semiconductor device including a body of semiconducitve material having two zones of one conductivity type and a third zone of the opposite conductivity type between and in contact with said two zones, means for applying signals from one of said sources to said third zone to cyclically render the current path between said two zones in said semi-conductor device conducting and non-conducting in accordance with said signals from said one source, means coupled to the other of said sources for impressing a potential across said two zones which cyclically varies in amplitude and reverses in polarity in accordance with signals from the other of said sources such that when said current path is rendered conducting the current in said current path varies in amplitude in accordance with the amplitude variations of said impressed potential and flows in one direction between said outer zones when the impressed potential is of a first polarity and flows in the opposite direction between said outer zones when the impressed potential is of the opposite polarity from said first polarity, and means responsive to the magnitude and direction of the current in said current path for providing a phase detector output signal indicative of the phase difference between the signals of said first and second sources.

2. In an electrical system including a first source of cyclically varying waves and a second source of cyclically varying waves, a phase detector comprising the combination of a semiconductor device including a body of semiconductive material having two zones of conductivity type and a third zone of the opposite conductivity type between and in contact with said two zones, means coupled to said first source for applying signals from said first source to said third zone to alternately render conducting and non-conducting the current path in said semi-conductor device between said two zones in accordance with the cyclic variations of said waves from said first source, means coupled to said second source for applying signals from said second source between said two zones to provide a current in said current path between said two zones during each cyclically recurring period when said current path is rendered conducting, the magnitude and direction of which current respectively vary in accordance with whatever variations in amplitude and polarity occur in said waves from said second source during said conducting period, and a load impedance traversed by said current for developing an output waveform continually indicative of the phase relationship between the respective cyclically varying waves from said first and second sources.

3. Phase comparison apparatus for detecting the phase relationship between cyclically varying waves from a first source and cyclically varying waves from a second source, said apparatus comprising the combination of a semiconductor device comprising a body of semiconductive material including three successive zones of alternately opposite conductivity types, a first circuit including said first source connected between the outer zones of said semiconductor device for establishing a potential difference between said outer zones which cyclically varies in amplitude and reverses in polarity in accordance with the cyclic variations of the waves from said first source and which causes instantaneously corresponding variations in amplitude and reversals in polarity of the flow of current between said outer zones whenever said flow is permitted, a second circuit including said second source connected between one of said outer zones and the intermediate zone of said semiconductor device for controlling the flow of current between said outer zones such that said flow is permitted only during a predetermined portion of each cycle of the waves from said second source, and means for deriving an output voltage wave form having a D. C. component indicative of both the magnitude and sense of any deviation from a predetermined phase difference between said signals, said last-named means comprising a load impedance included in said first circuit in series with said source.

4. In a signalling system including a first signal source, the signal output of said first source comprising frequency modulated waves, and a second signal source, the signal output of said second source comprising frequency modulated waves out of phase with the frequency modulated waves supplied by said first source by an amount determined by the instantaneous frequency thereof, a demodulator comprising the combination of a semiconductor device including a body of semiconductive material having two zones of one conductivity type and a third zone of the opposite conductivity type between and in contact with said two zones, means for applying signals from said first source between said third zone and one of said two zones, means for applying signals from said second source between said two zones, and an output impedance responsive to a flow of current between said two zones.

5. In a signalling system including a source of frequency modulated waves having a predetermined center frequency, the combination comprising, a semiconductor device including a body of semiconductive material including three successive zones of alternately opposite conductivity types, means for applying a first signal comprising the frequency modulated waves supplied by said source between the intermediate zone and one of the outer zones of said semiconductor device, means for developing a second signal comprising frequency modulated waves out of phase with the frequency modulated waves supplied by said source by an angle determined by the instantaneous frequency thereof, said developing means comprising a transformer having a primary and a secondary, said transformer primary being coupled to said source, and said transformer secondary being tuned to said predetermined center frequency, means for applying said second signal between the outer zones of said semiconductor device, and a load impedance responsive to a flow of current between said outer zones.

6. In a signalling system including a first source of cyclically varying waves and a second source of cyclically varying waves, apparatus for detecting differences in phase between the signals from said two sources comprising the combination of a transistor having base, emitter, and collector electrodes, means for establishing a potential difference between said emitter and collector electrodes which cyclically varies in amplitude and reverses in polarity in accordance with the cyclic variations of the waves from said first source, said establishing means comprising means for applying signals from said first source between said emitter electrode and said collector electrode, means comprising a coupling between said second source and said base electrode for controlling the flow of current between said emitter and collector electrodes in accordance with the waves of said second source such that a current flow between said emitter and collector electrodes is enabled to follow concomitantly variations in amplitude and reversals in polarity of said potential difference only during a predetermined portion of each cycle of the waves of said second source, and integrating means responsive to current between said emitter electrode and said collector electrode for providing an output which varies in polarity and amplitude in accordance with the sense and magnitude, respectively, of any deviation from a predetermined phase relationship between the waves of said first and second sources.

7. In a television system including a first source of signals, the signal output of said first source comprising synchronizing pulses, and a second source of signals, the signal output of said second source comprising sawtooth waves, a phase detector comprising the combination of a symmetrical semiconductor device including a body of semiconductive material having three successive zones of alternately opposite conductivity types having a bidirectional current path between said outer zones, means for utilizing signals from said first source applied between the intermediate zone and one of the outer zones of said semiconductor device to alternately render said bidirectional current path conducting and non-conducting, means for utilizing signals from said second source applied between the outer zones of said semiconductor device to control both the magnitude and direction of the current in said bidirectional current path when conducting, and a load impedance in series with said current path for developing an output voltage having a D. C. component representative in amplitude and polarity of the magnitude and sense, respectively, of any deviation from a predetermined phase relationship between the signals of said two sources.

8. In an electrical system including a first source of signals and a second source of signals, a phase detector comprising the combination of a semiconductor device having a current path of controllable conductivity, means for cyclically rendering said current path conductive and non-conductive in accordance with the signals from said first source, means for controlling in accordance with the signals from said second source the instantaneous magnitude and direction of current in said current path when rendered conductive, and means responsive to the current in said current path for developing an output signal indicative of the average D. C. value of the current in said current path.

9. In a television receiver comprising a synchronizing signal source, and a deflection circuit including means for generating scanning waves, a frequency-determining circuit for said generating means, and a variable impedance device included in said frequency-determining circuit, the combination comprising means coupled to said generating means for developing an A. C. signal having a frequency corresponding to the frequency of said scanning waves, a semiconductor device having a normally nonconductive current path, means for periodically rendering said current path conductive in response to said synchronizing signal, means for controlling the instantaneous magnitude and direction of current in said current path during its period of conductivity in accordance with said A. C. signal, and integrating means coupled to said current path for applying a signal representative of the difference in phase between said synchronizing signal and said A. C. signal to said variable impedance device.

10. In a signalling system including a source of a first signal comprising waves subject to deviation in frequency from a predetermined frequency, the combination comprising a semiconductor device having a current path of controllable conductivity, means for developing a second signal comprising corresponding in frequency to the waves of said first signal but out of phase therewith by an angle determined by the instantaneous frequency thereof, said developing means comprising a transformer having a primary and a secondary, said transformer primary being coupled to said source, and said transformer secondary being tuned to said predetermined frequency, means for cyclically rendering said current path conducting and non-conducting in accordance with one of said first and second signals, means for controlling the magnitude and direction of current in said current path during its conducting periods in accordance with the other of said first and second signals, and an output impedance coupled to said current path for developing an output having a D. C. component indicative in amplitude and polarity of the magnitude and sense of said deviation in frequency from said predetermined frequency.

11. In a signalling system including a first source of signals and a second source of signals, apparatus for detecting differences in phase between the signals from said two sources comprising the combination of a symmetrical transistor having an input electrode, an output electrode and a common electrode, means for coupling said first source between said input electrode and said common electrode, means for coupling said second source between said common electrode and said output electrode to provide a current therebetween having a D. C. component indicative in amplitude and polarity of the magnitude and sense, respectively, of any deviation from a predetermined phase relationship between the signals of said first and second sources, and an integrating means responsive to current between said common electrode and said output electrode for developing an error signal output representative of such phase deviation.

12. In a signalling system including a first source of signals and a second source of signals, apparatus for detecting differences in phase between the signals from said two sources comprising the combination of a transistor having a base electrode and a pair of additional, substantially equivalent, electrodes, means coupled to said first source and to said base electrode for alternately enabling and disabling the flow of current in said transistor between said additional electrodes in periodic succession in synchronism with the signals of said first source, means for controlling the instantaneous magnitude and direction of the current enabled to flow between said additional electrodes in accordance with those portions of the signals of said second source which coincide with the enabling period, said controlling means comprising means for coupling said second source between said pair of additional electrodes, and an output impedance responsive to the controlled current flowing between said pair of additional electrodes for developing an output current waveform in which the excess or deficiency, if any, of current flow in one direction relative to current flow in the opposite direction is indicative of the phase relationship between the signals of said first and second sources.

13. In a signalling system including a first source of signals and a second source of signals, a phase detector comprising the combination of a symmetrical transistor having base, emitter, and collector electrodes, means for applying signals from said first source between said base electrode and one of said emitter and collector electrodes, and an output circuit including said second source connected between said emitter electrode and said collector electrode to provide a current therebetween, the D. C. component of which has a magnitude and polarity indicative of the magnitude and sense of a deviation, if any, from a predetermined phase difference between the signals from said sources.

14. Phase comparison apparatus for detecting differences in phase between a pair of signals comprising the combination of a semiconductor device having a bi-directional current path of controllable conductivity, means for cyclically rendering said current path conducting and nonconducting in accordance with one of said pair of signals, means for determining in accordance with the other of said pair of signals the magnitude and direction of current in said current path when rendered conducting, said determining means comprising means for applying the other of said pair of signals across said current path, and means coupled to said current path for deriving an output signal representative of the D. C. component of the current flow through said current path.

15. In an electrical system including a first source of signals and a second source of signals, a phase detector comprising the combination of a symmetrical semiconductor device having a bidirectional current path of controllable conductivity, means for cyclically rendering said current path conductive and nonconductive in accordance with the signals of said first source, and means for controlling in accordance with the signals from said second source the magnitude and direction of current in said current path when rendered conductive.

16. In a television receiver including a synchronizing signal source, and a source of sawtooth waves, the combination comprising a symmetrical semiconductor device having a bidirectional current path of controllable conductivity, means for normally rendering said current path nonconductive, means for periodically rendering said current path conductive in response to said synchronizing signal, and means for controlling the magnitude and direction of current in said current path during each period of conductivity in accordance with said sawtooth wave.

17. Apparatus in accordance with claim 16 including integrating means coupled to said current path for deriving from said controlled current an error signal of a magnitude and polarity indicative of the magnitude and sense of any deviation from a predetermined phase relationship between said synchronizing signal and sawtooth wave.

(References on following page)

References Cited in the file of this patent

UNITED STATES PATENTS

| | | |
|---|---|---|
| 2,486,776 | Barney | Nov. 1, 1949 |
| 2,503,700 | Barco | Apr. 11, 1950 |
| 2,598,370 | Gruen | May 27, 1952 |
| 2,627,039 | MacWilliams | Jan. 27, 1953 |
| 2,629,834 | Trent | Feb. 24, 1953 |
| 2,645,717 | Massman | July 14, 1953 |
| 2,657,360 | Wallace | Oct. 27, 1953 |
| 2,691,073 | Lowman | Oct. 5, 1954 |
| 2,713,665 | Raisbeck et al. | July 19, 1955 |

UNITED STATES PATENT OFFICE
CERTIFICATE OF CORRECTION

Patent No. 2,876,382                                                        March 3, 1959

George C. Sziklai

It is hereby certified that error appears in the printed specification of the above numbered patent requiring correction and that the said Letters Patent should read as corrected below.

Column 1, line 18, for "current" read -- currents --; column 6, line 24, for "of", first occurrence, read -- or --; column 7, line 61, for "phase is" read -- phase shift is --; column 8, line 65, for "become" read -- becomes --; column 11, line 75, for "vices." read -- vices." --; column 12, line 54, for "semiconducitve" read -- semiconductive --; column 14, line 52, after "types" insert -- and --.

Signed and sealed this 19th day of April 1960.

(SEAL)
Attest:

KARL H. AXLINE
Attesting Officer

ROBERT C. WATSON
Commissioner of Patents